(12) United States Patent
Schinzel

(10) Patent No.: US 12,151,251 B2
(45) Date of Patent: Nov. 26, 2024

(54) CENTRIFUGAL PROCESSING UNIT

(71) Applicant: TECAN TRADING AG, Mannedorf (CH)

(72) Inventor: Fred Schinzel, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 861 days.

(21) Appl. No.: 17/294,499

(22) PCT Filed: Nov. 20, 2018

(86) PCT No.: PCT/EP2018/081976
§ 371 (c)(1),
(2) Date: May 17, 2021

(87) PCT Pub. No.: WO2020/104024
PCT Pub. Date: May 28, 2020

(65) Prior Publication Data
US 2021/0402415 A1 Dec. 30, 2021

(51) Int. Cl.
*B04B 5/04* (2006.01)
*B04B 11/04* (2006.01)
*G01N 35/00* (2006.01)

(52) U.S. Cl.
CPC ....... *B04B 5/0421* (2013.01); *G01N 35/0099* (2013.01); *B04B 2011/046* (2013.01); *G01N 2035/00495* (2013.01)

(58) Field of Classification Search
CPC ............ B04B 5/0421; B04B 2011/046; G01N 35/0099; G01N 2035/00495
See application file for complete search history.

(56) References Cited

U.S. PATENT DOCUMENTS

| 4,236,666 A | 12/1980 | Aeschlimann et al. |
| 2013/0288873 A1* | 10/2013 | Barbee .................... B04B 13/00 494/9 |
| 2015/0166208 A1* | 6/2015 | Miyauchi ........... G01N 35/0099 53/381.1 |

FOREIGN PATENT DOCUMENTS

| DE | 2831156 A1 * | 1/1980 | .......... B04B 5/0421 |
| DE | 4323844 A1 | 1/1995 | |
| EP | 3421135 A1 | 1/2019 | |

OTHER PUBLICATIONS

Anonymous: "Zentrifugierverfahren", Research Disclosure Jun. 1978, vol. 2244, No. 170, 17024, Jun. 1978 (Jun. 1978), XP001707089.
(Continued)

*Primary Examiner* — Walter D. Griffin
*Assistant Examiner* — Shuyi S. Liu
(74) *Attorney, Agent, or Firm* — Notaro, Michalos & Zaccaria P.C.

(57) ABSTRACT

A centrifugal processing unit for directing the movement of substances within a sample processing cartridge has a rotor with an accommodation for receiving the sample processing cartridge, the accommodation only allowing a free pivoting motion of the cartridge about a respective pivot axis, wherein each pivot axis is orthogonal to the rotor axis and to a respective force vector of a centrifugal force, a rotor drive to create the centrifugal force, a blocking element, allowing the free pivoting motion of the cartridge in a release position and preventing the free pivoting motion in a blocking position, wherein the blocking element is arranged on the rotor spaced apart above the accommodation is disclosed.

20 Claims, 7 Drawing Sheets

(56) References Cited

OTHER PUBLICATIONS

International Search Report and Written Opinion for corresponding PCT application No. PCT/EP2018/081976, mailed Jul. 16, 2019.

* cited by examiner

CENTRIFUGAL PROCESSING UNIT

TECHNICAL FIELD OF THE INVENTION

The current invention relates to a centrifugal processing unit for directing the movement of substances within a sample processing cartridge.

DESCRIPTION OF THE RELATED ART

Such a centrifugal processing unit is disclosed in U.S. Pat. No. 4,236,666. It comprises two magazines for several sample containers, wherein the magazines are arranged on arms that extend outwards from an axis of rotation, opposite of each other. Each magazine is rotatable around and is slidable along a respective axle. On each arm, on one side of the respective magazine, a locking pin is arranged and each magazine comprises a corresponding recess for said locking pin. If the axis of rotation is rotated in one direction, each magazine abuts on the side of the arm without a locking pin and can rotate around its axle. If the axis of rotation is rotated in the opposite direction, each magazine slides along its axle and abuts on the side of the arm with a locking pin, thus preventing its rotation around its axle. The sliding and abutting creates an additional unwanted force vector.

SUMMARY OF THE INVENTION

It is therefore a task of the current invention to provide a centrifugal processing unit for directing the movement of substances within a sample processing cartridge by means of which additional unwanted force vectors are prevented.

This problem is solved by a centrifugal processing unit with the features of claim 1. Further embodiments of the centrifugal processing unit, a centrifugal processing system as well as a process for directing the movement of substances within a sample processing cartridge are defined by the features of further claims.

A centrifugal processing unit for directing the movement of substances within a sample processing cartridge comprises at least one rotor with at least one accommodation for receiving the sample processing cartridge, the at least one accommodation only allowing a free pivoting motion of the cartridge about a respective pivot axis, wherein each pivot axis is orthogonal to the rotor axis and to a respective force vector of a centrifugal force, at least one rotor drive for rotating the at least one rotor about a respective rotor axis to create the centrifugal force, a control for accelerating and decelerating the at least one rotor, at least one blocking element, allowing the free pivoting motion of the cartridge in a release position and preventing the free pivoting motion in a blocking position, wherein the blocking element is arranged on the at least one rotor spaced apart above the at least one accommodation.

With such an arrangement, the blocking element can engage the accommodation, and/or a cartridge inserted in the accommodation. Additionally, such a blocking element can act as a cover for the inserted cartridge. Also, such a design allows the user immediately to recognize, which cartridges will be pivoted during the rotation of the rotor and which won't.

In an embodiment, the blocking element is arranged at the top of the shaft of the rotor. As such, no additional elements are needed that would make the assembly heavier and thus, would increase the total mass to be rotated.

In an embodiment, the blocking element comprises at least one fixation element, which prevent a relative movement between the blocking element and the rotor during the rotation of the rotor. Such a fixation element can be self-activating, for example a preloaded spring or spring package. Alternatively, the fixation element can comprise a pin that can be interlocked with an element arranged on the rotor. Any suitable fixation element can be uses that prevents the relative rotation of the blocking element with respect to the rotor. Usually, the fixation force needs to be as high as the inertia forces, which arise from the positive or negative acceleration of the rotor rotation.

In an embodiment, the blocking element comprises a disk, which is connected to the rotor shaft at its centre, at least one recess that extends from an outer edge of the disk towards the centre, and a handle, which is arranged on top of the disk at its centre. With this shape, a blocking element can be realised, that is widely spread and low in weight.

In an embodiment, the blocking element comprises two or more recesses that are evenly distributed on the circumference of the disk, so that the centre of gravity of the blocking element corresponds to the centre of the disk. With this, the centre of gravity of the disk, in the mounted state, will be allocated on the rotor axis and thus, the mass of the blocking element will be evenly distributed around the rotor axis. There won't be any vibrations caused by unbalanced rotating masses.

In an embodiment, the blocking element comprises two or more recesses that are asymmetrically distributed on the circumference of the disk and at least one balancing weight, that is arranged on the disk as such, that the centre of gravity of the blocking element corresponds to the centre of the disk. By adding a balancing weight, the blocking element can be made balanced around the rotor axis.

In an embodiment, each recess is designed to allow only the fee pivoting motion of a single cartridge. Like so, it is obvious for a user, which cartridge will be pivoted during the rotation of the rotor and which won't.

In an embodiment, each recess is designed to allow the fee pivoting motion of two or more cartridges. This provides a flexible centrifugal processing unit, in which the simultaneous pivoting of one or more cartridges can be allowed or prevented.

In an embodiment, the at least one accommodation comprises an abutment, which prevents the sample processing cartridge from pivoting over a predefined angle. A corresponding abutting element can be arranged on the sample processing cartridge or on the frame for receiving the sample processing cartridge. As the free pivoting motion allowing an angular deviation of 0 degrees to about 90 degrees, the design with an abutment allows the selective setting of the angular motion of the sample processing cartridge in the range of greater than 0 degrees to smaller than 90 degrees. With this, the content of the sample processing cartridge can be moved at an angle with respect to the orientation of the sample processing cartridge.

The features of the above-mentioned embodiments of the centrifugal processing unit can be used in any combination, unless they contradict each other.

A centrifugal processing system for directing the movement of substances within a sample processing cartridge comprising a centrifugal processing unit according to one of the above-mentioned embodiments and at least one manipulator, adapted to be able to arrange the sample processing cartridge in the at least one accommodation or to remove it therefrom. A manipulator prevents human handling errors. Additionally, in a clean environment, the manipulator allows the handling of the cartridges without the risk of contamination during the handling of the cartridges.

In an embodiment, the manipulator is adapted to be able to move the sample processing cartridge in any horizontal or vertical direction. The combination of the vertical and at least one horizontal movement allows the placement of the cartridges in the centrifugal processing unit and their removal therefrom. By transferring a cartridge from one accommodation to an accommodation opposite thereof, changes the orientation of the cartridge with respect to the rotor. The same change of orientation can be achieved by a rotation of the cartridge.

In an embodiment, the manipulator is adapted to be able to perform an angular rotation of the sample processing cartridge about an axis parallel to the rotor axis. The change of orientation of the cartridge results in a change of the orientation of the force vector of the centrifugal force during the centrifugation of the corresponding cartridge. For example, the angular rotation is a rotation about an angle greater than 0 degrees, particularly 90 degrees or 180 degrees. The rotation of the cartridge about 180 degrees allows to invert the force vector resulting from the applied centrifugal force.

In an embodiment, the manipulator is adapted to be able to grip the handle of the blocking element and to realise a relative angular rotation between the blocking element and the rotor with respect to the rotor axis. Alternatively, the relative rotation between the blocking element and the rotor can be done by a user. With the manipulator performing the rotation, an automated system can be provided, in which user errors can be prevented.

In an embodiment the centrifugal processing system further comprises at least one additional station, wherein the at least one additional station can be selected from the group of loading/unloading station, sealing station, irradiation station (electromagnetic, radioactive), hating station (contact, convection) detection/quantification station and identification station or any other commonly known station for the treatment of the content of a sample processing cartridge or the handling of a sample processing cartridge. The incorporation of these additional stations provides a wide variety of options and allow a versatile use of the system. These stations can be arranged next to each other on a single base. Additionally, they can be allocated within an accessible housing. The housing can be removed or can be opened, partially of fully.

The loading and unloading can be at the same place or can be allocated at various places, i.e. a loading station and an unloading station. These stations can provide space for individual cartridges or for carriers for several cartridges. The loading station may also comprise a pipetting station, where substances, reagents, samples or reconstitution buffers can be added, mixed or transferred to respective compartments in the cartridges.

In the sealing station, the cartridges are sealed to prevent substances from leaving or entering the cartridges.

In the irradiation station, intermediates or final products can be exposed to any kind of irradiation. For example, the irradiation can be electromagnetic, such as light or heat, or radioactive.

In the heating station, intermediates or final products can be exposed to any kind of heat, for example, through contact or through convection. For example, the heat can be kept constant in an isothermal incubator, for example in the range of 4 to 98 degrees centigrade. In a gradient incubator or Thermocycler, any heating or cooling gradient can be combined with each other or with temperature plateaus.

In the detection/quantification station, intermediates or final products can be detected or quantified by any kind of optical or electronical detection/quantification.

In the identification station, the cartridges can be identified by means of one-dimensional or two-dimensional bar code scanners, matrix scanners, RFID scanners or imaging systems.

The features of the above-mentioned embodiments of the centrifugal processing system can be used in any combination, unless they contradict each other.

A process for directing the movement of substances within a sample processing cartridge comprises the steps of:
  Providing a centrifugal processing unit according to one of the above-mentioned embodiments;
  Inserting a sample processing cartridge in the at least one accommodation;
  Positioning the blocking element in the release position, thereby allowing a free pivoting motion of the at least one accommodation when the rotor is rotated, and thereby creating a first force vector in a first direction with respect to the inserted sample processing cartridge;
  Rotating the at least one rotor about the respective rotor axis;
  Stopping the rotation and thereby allowing the sample processing cartridge to return to its initial position;
  Positioning the blocking element in the blocking position, thereby preventing a free pivoting motion of the at least one accommodation when the rotor is rotated, and thereby creating a second force vector in a second direction with respect to the inserted sample processing cartridge.

In an embodiment, the process further comprises the steps of:
  Removing the sample processing cartridge from the at least one accommodation;
  Rotating the sample processing cartridge about an axis parallel to the rotor axis;
  Inserting the sample processing cartridge in the at least one accommodation;
thereby enabling the creation of a third force vector in a third direction with respect to the sample processing cartridge when the at least one rotor is rotated and the blocking element is in the blocking position.

In an embodiment, the process further comprises the steps of:
  Positioning of the sample processing cartridge in an at least one additional station before or after inserting the sample processing cartridge in the accommodation, wherein the at least one additional station can be selected from the group of loading/unloading station, sealing station, irradiation station (electromagnetic, radioactive), heating station (contact, convection), detection/quantification station, unloading station, identification station.

In an embodiment, the free pivoting motion of the sample processing cartridge is partially restricted by providing the accommodation with an abutment before the at least one rotor is rotated.

The abutment can be provided initially or just before the rotation of the rotor. It is also possible to provide such angularly restricted accommodations from the beginning, i.e. as factory setting or to place an abutment in a respective accommodation at the latest, just before the rotor is rotated by hand or by manipulator. It is also possible to allocate an abutment at the accommodation between these two points in time.

The features of the above-mentioned embodiments of the process for directing the movement of substances within a sample processing cartridge can be used in any combination, unless they contradict each other.

BRIEF DESCRIPTION OF THE DRAWINGS

Embodiments of the current invention are described in more detail in the following with reference to the figures. These are for illustrative purposes only and are not to be construed as limiting. It shows FIG. 1 a side view of a centrifugal processing unit according to the invention.

DETAILED DESCRIPTION OF THE INVENTION

Figure 1:
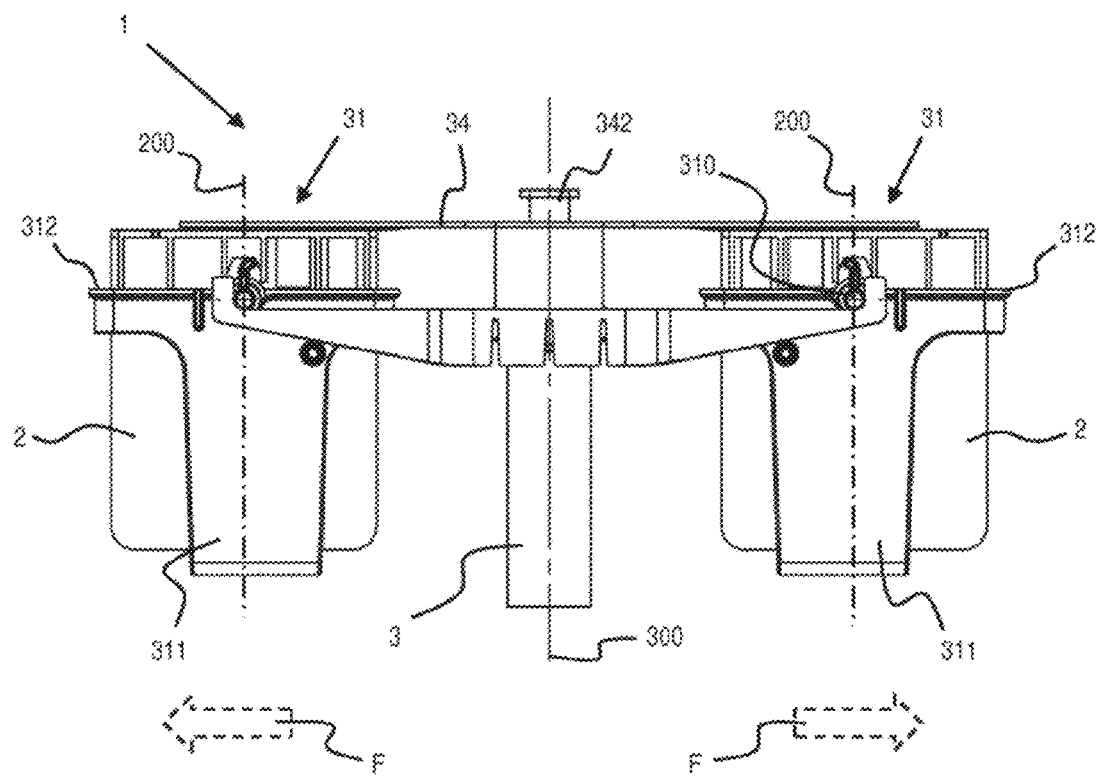
Figure 2:
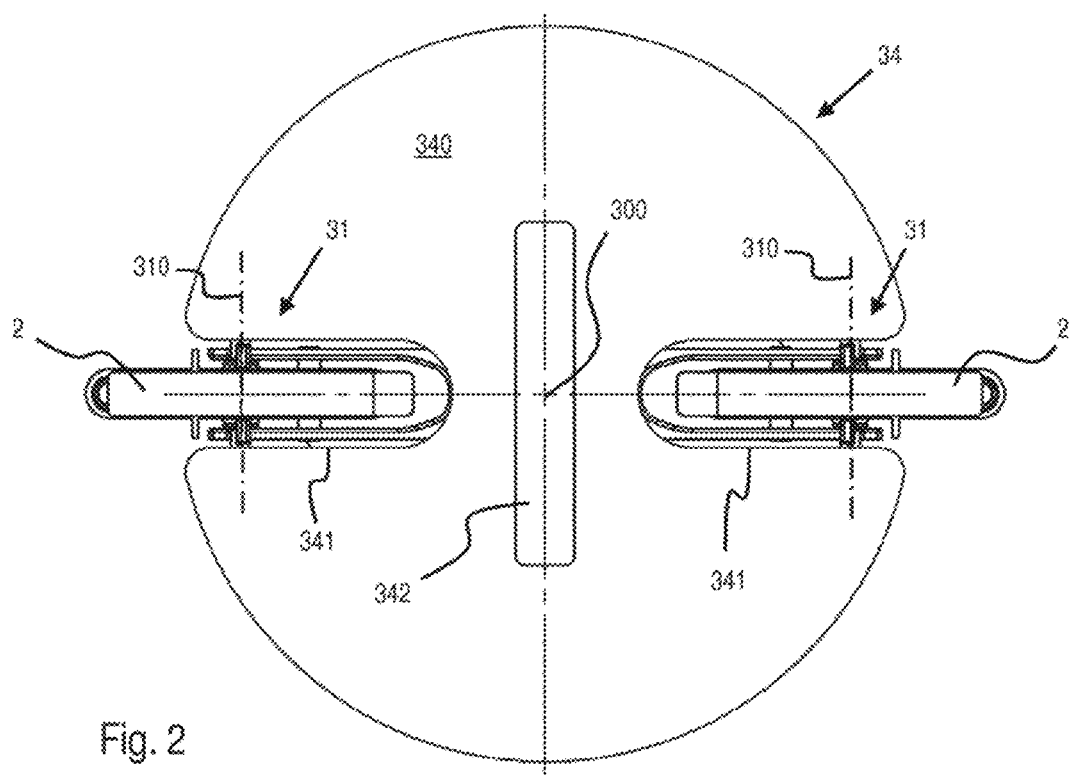
FIG. 2 a top view of the centrifugal processing unit of FIG. 1.

FIG. 1 shows a side view and FIG. 2 a top view of the centrifugal processing unit 1 according to the invention.

The centrifugal processing unit 1 for directing the movement of substances within a sample processing cartridge 2 comprises a rotor 3 for receiving the sample processing cartridge 2, at least one rotor drive (not shown) for rotating the at least one rotor 3 about a respective rotor axis 300 to create a centrifugal force F, a control (not shown) for accelerating and decelerating the at least one rotor 3. The rotor 3 comprises two arms that extend laterally from the central rotor axis 300 on opposite sides from the rotor axis 300. The centrifugal processing unit 1 further comprises a pivot accommodation 31 for receiving the sample processing cartridge 2. The pivot accommodation 31 is arranged on the rotor 3 and adapted to allow a free pivoting motion of the received sample processing cartridge 2 about a respective pivot axis 310. The pivot axis 310 is orthogonal to the rotor axis 300 and to the respective force vector F of the centrifugal force. Each pivot accommodation 31 is allocated at one of the free ends of the two rotor arms. Each pivot accommodation 31 comprises a frame 311 for receiving the sample processing cartridge 2. The frame of each accommodation is adapted for receiving the sample processing cartridge 2 in a first orientation and for receiving the sample processing cartridge 2 in a second orientation, wherein the second orientation corresponds to an angular rotation of 180 degrees of the sample processing cartridge 2 about a central axis 200 parallel to the rotor axis 300. Each frame comprises a respective flange 312 at its upper rim. Each flange is extending outwards. A blocking element 34 is arranged on the top of the shaft of the rotor 3. The blocking element 34 comprises a circular disk 340, which laterally extends over the lateral position of the pivot accommodation 31. The vertical distance between the pivot accommodation 31 and the blocking element 34 is designed as such, that a sample processing cartridge 2 inserted in the pivot accommodation 31, does not extend above the lower surface of the disk 340 of the blocking element 34. A fixation element (not shown) prevents an undesired relative rotation between the rotor and the blocking element 34. The fixation element creates a holding force, which needs to be overcome to rotate the blocking element 34 with respect to the rotor 3. The fixation element is set as such, that the holding force is bigger than the inertia forces that result from the maximal positive or negative acceleration of the blocking element 34. A handle 342, which is fixed to the top of the disk 340 facilitates a relative rotation between the rotor 3 and the blocking element 34. The actuation of the handle 342 can be manually or by means of a manipulator or the like. Two recesses 341 are allocated on two opposing lateral sides of the disk 340. Each recess extends from an outer edge of the disk 340 towards its centre. The width and depth of each recess 341 is designed as such, that a free pivoting motion of the pivot accommodation 31, respectively of a sample processing cartridge 2 inserted in the pivot accommodation 31 is not prevented, when the recesses are allocated above the pivot accommodation 31. The width of each recess 341 is at least bigger than the width of a sample processing cartridge 2 to be inserted and the depth of each recess 341 is at least bigger as the projection of the innermost edge of a sample processing cartridge 2 to be inserted. The centre of the disk 340 corresponds to the location of the rotor axis 300 of the rotor 3. The weight distribution of the blocking element 34 is designed as such, that the centre of gravity corresponds to the centre of the disk 340.

Figure 3:
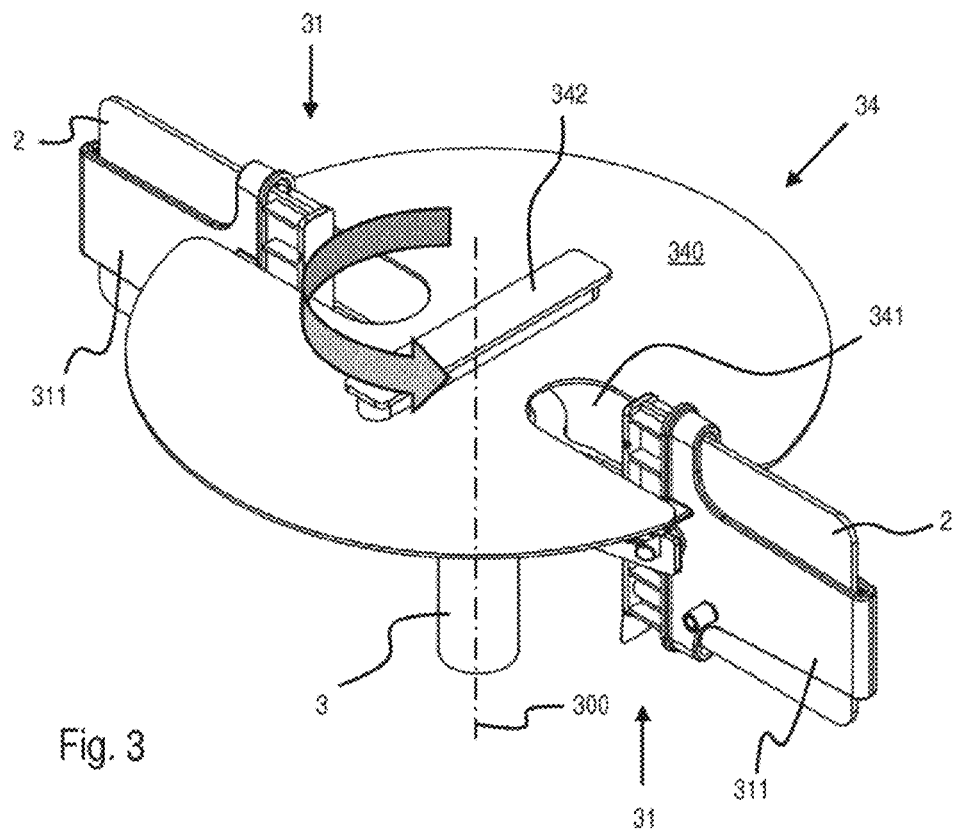
FIG. 3 an isometric view of the centrifugal processing unit of FIG. 1 during rotation.

FIG. 3 shows an isometric view of the centrifugal processing unit of FIG. 1 during rotation. Due to the position, respectively orientation of the Fixation element 34, the recesses 341 are allocated above the pivot accommodation 31 and the pivoting of the inserted sample processing cartridges 2 is not prevented. When turned, due to the centrifugal force, the frame 311 together with the therein received cartridge 2 of the pivot accommodation 31 performs a pivoting motion about pivot axis 310. In the depicted case, the angular deflection of the cartridge in the rotated state with respect to its position of rest is about 90 degrees.

Figure 4:
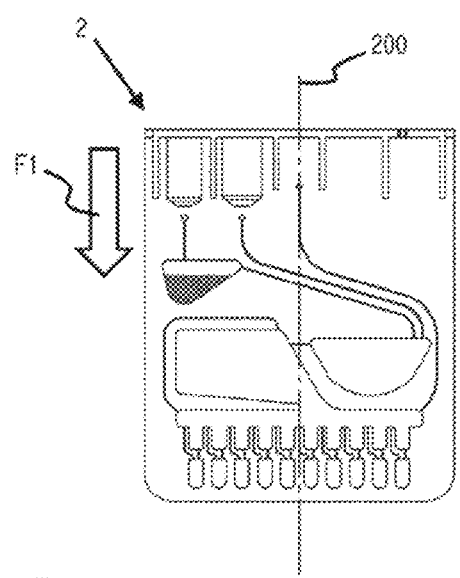
FIG. 4 a sample processing cartridge received in a pivot accommodation during rotation.

FIG. 4 shows a sample processing cartridge 2 received in a pivot accommodation during rotation. For a better visibility, only the cartridge 2 is shown. During the rotation of the rotor 3, the centrifugal force F acts on the cartridge in a first direction, resulting in a first force vector F1 acting on substrates to be moved within the sample processing cartridge 2 and directing them in the first direction. With respect to the orientation of the cartridge in its position of rest, the first force vector points downwards. Thus, substances that have been inserted into the cartridge at its top, are moved downwards. In the pivot accommodation 31, the resulting force vector always points downwards, even when the cartridge is rotated about its central axis 200.

Figure 5:
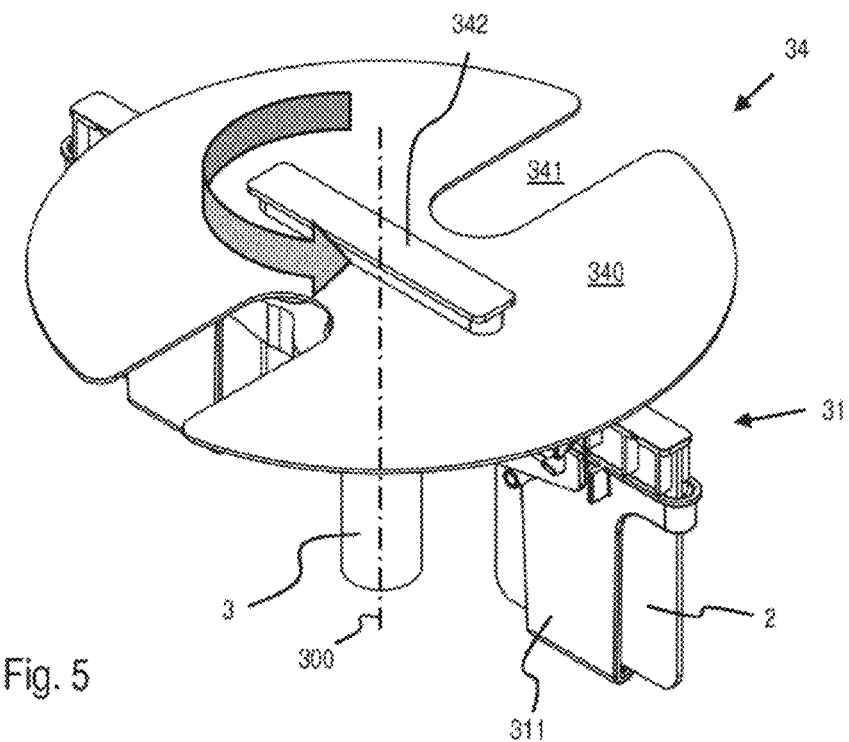
FIG. 5 an isometric view of the centrifugal processing unit of FIG. 1 with blocked cartridges.

FIG. 5 shows an isometric view of the centrifugal processing unit 1 of FIG. 1 with blocked cartridges 2. As there is an angular offset between the position of the inserted cartridges 2, respectively of the accommodation 31, the pivoting motion of the cartridges 2 are prevented by the disk 340 of the blocking element 34. In the depicted case, during rotation, the top edge of the cartridges 2 abuts the lower surface of the disk 340.

Figure 6:
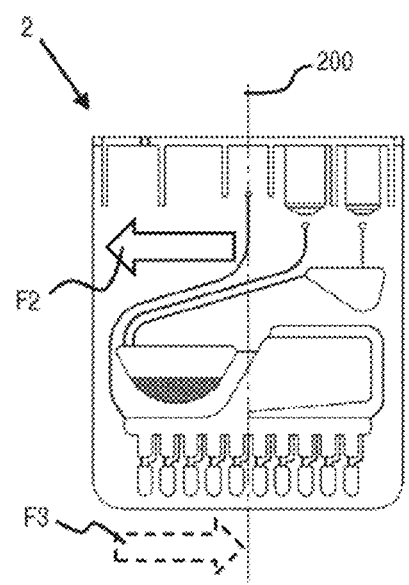
FIG. 6 a sample processing cartridge during rotation with blocked cartridges.

FIG. 6 shows a sample processing cartridge 2 during rotation with blocked cartridges. For a better visibility, only the cartridge 2 is shown. During the rotation of the rotor 3, the centrifugal force F acts on the cartridge in a second direction, resulting in a second force vector F2 acting on substrates to be moved within the sample processing cartridge 2 and directing them in the second direction. With respect to the orientation of the cartridge in its position of rest, the second force vector F2 points to one side. Thus, substances within the cartridge are moved to that side. When the cartridge in the fix accommodation 32 is rotated about its central axis 200, the centrifugal force F acts on the cartridge in a third direction, essentially opposite to the second direction, during the rotation of the rotor 3, resulting in a third force vector F3 acting on the substrates in the cartridge and moving them in the third direction. With respect to the orientation of the cartridge in its position of rest, the third force vector F3 points essentially to the opposite direction than the second force vector F2. Thus, substrates within the cartridge are moved towards that side.

Figure 7:
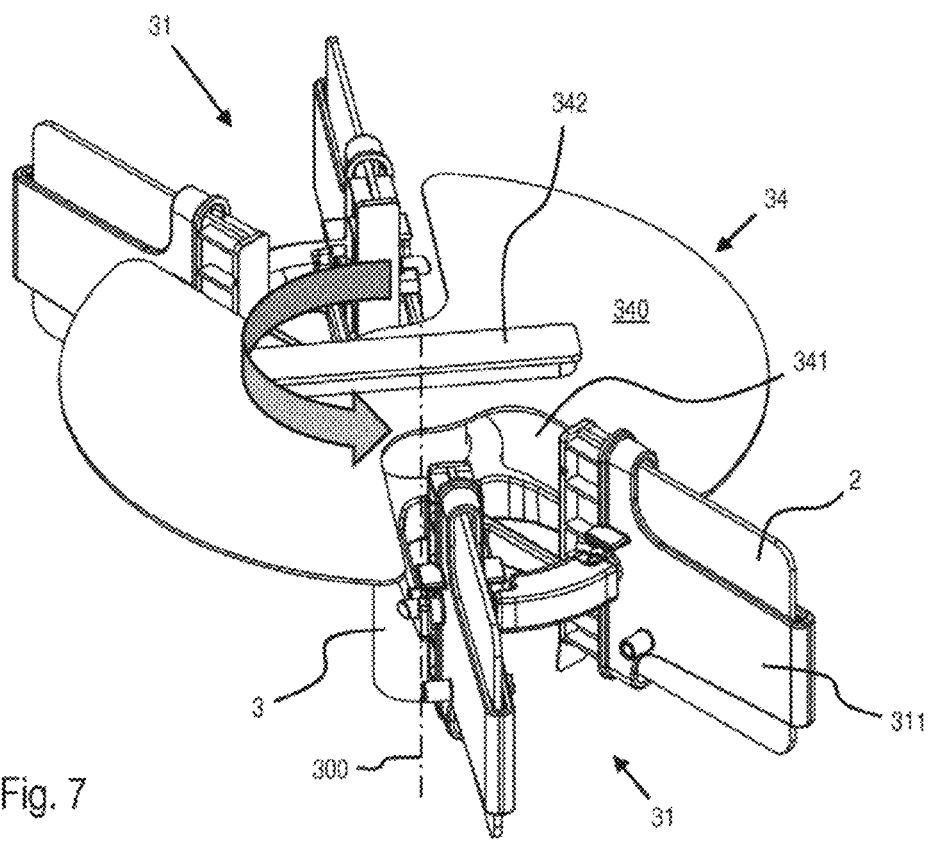
FIG. 7 an isometric view of another embodiment of a centrifugal processing unit according to the invention during rotation with released cartridges.
Figure 8:
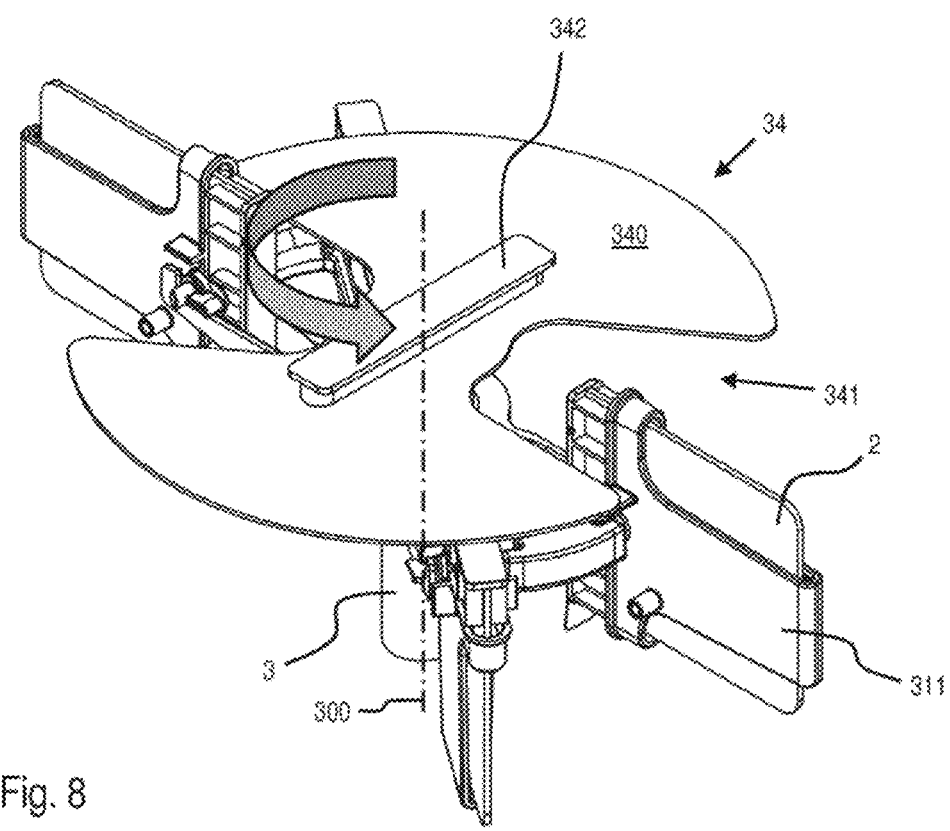
FIG. 8 the centrifugal processing unit of FIG. 7 with partially blocked cartridges.
Figure 9:
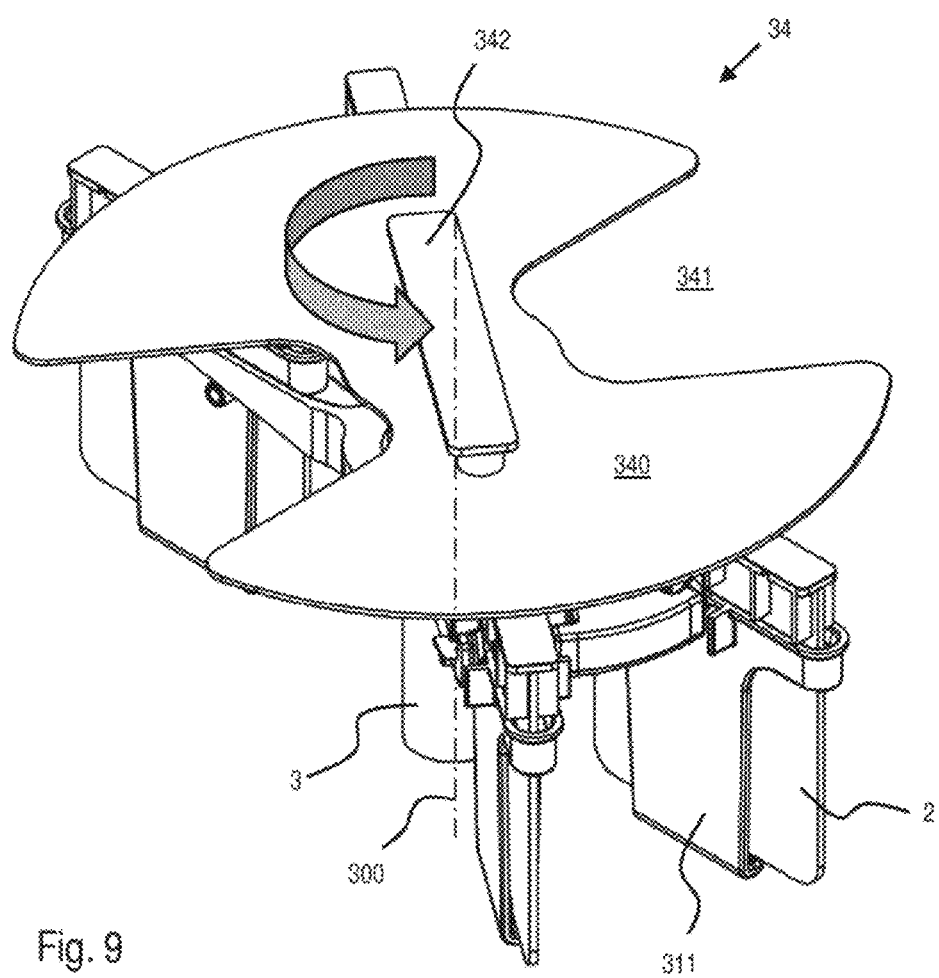
FIG. 9 the centrifugal processing unit of FIG. 7 with all cartridges being blocked.

FIG. 7 shows an isometric view of another embodiment of a centrifugal processing unit 1 according to the invention during rotation with released cartridges 2, FIG. 8 shows the same with partially blocked cartridges 2 and FIG. 9 the same with all cartridges 2 being blocked. The rotor 3 comprises two arms that are arranged on opposite sides with respect to the rotor axis 300. Two pivot accommodations 31 are arranged on each of the two arms. The two pivot accommodations 31 are arranged at an angle to each other. Each of the accommodations on one arm have an opposing counterpart on the other arm, such that the centre of gravity of the rotor 3 corresponds to the rotor axis 300. The recesses 341 in the disk 340 are designed as such, that two cartridges 2, respectively two frames 311 can pivot freely during the rotation of the rotor 3, when the recesses are allocated above both accommodations 31 on both arms. With this configuration, it is also possible to insert or remove cartridges 2 in or from the respective accommodation 31. By means of a relative rotation of the blocking element 34 with respect to the rotor 3 about an angle that corresponds to half of the opening angle of the recess 341, the pivoting motion of one cartridge 2 on each rotor arm can be prevented during the rotation of the rotor 3. When the blocking element 34 is rotated by the full opening angle of the recess 341, the pivoting motion of all cartridges 2 is prevented during the rotation of the rotor 3.

Figures 10, 11:
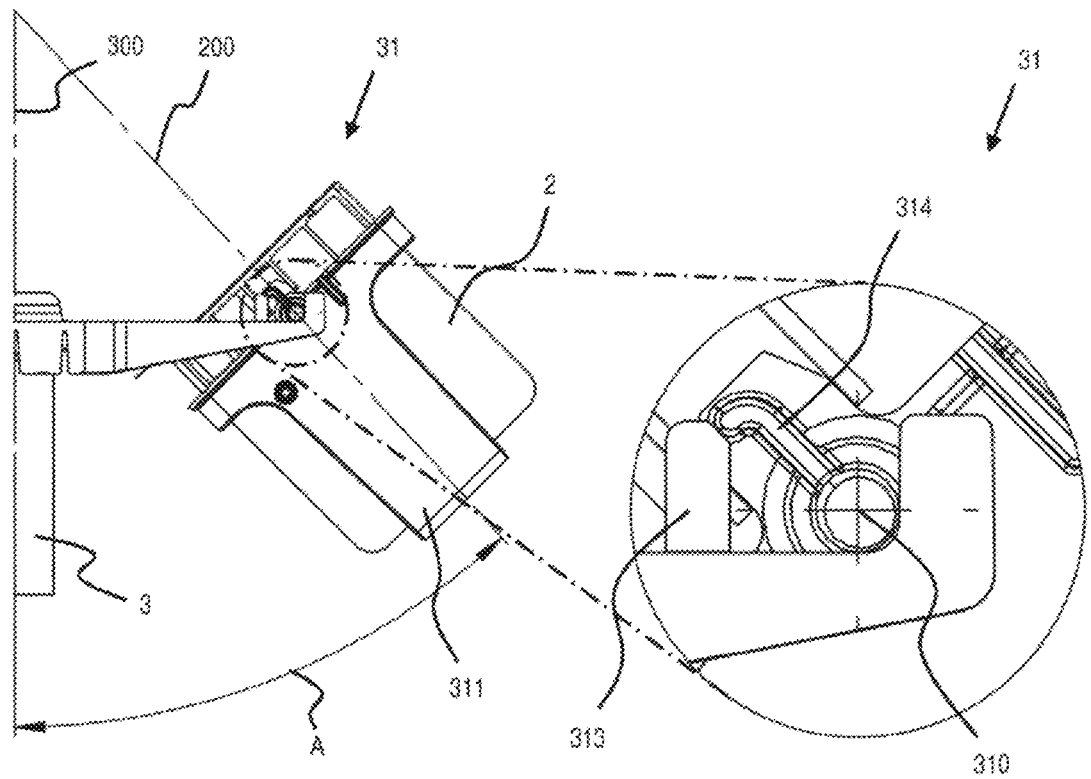
FIG. 10 a partial side view of a centrifugal processing unit with a restricted angular deviation at the pivot accommodation.
FIG. 11 a detail of the pivot accommodation of FIG. 10.

FIG. 10 shows a partial side view of a centrifugal processing unit 1 with a restricted angular deviation A at the pivot accommodation 31 and FIG. 11 shows a detail of the pivot accommodation 31 of FIG. 6. On the rotor arm, close to the pivot axis 310, an abutment 313 is arranged. The abutment 313 extends upwards from the rotor arm and comprises an abutment surface 314 at its upper end region. The abutment surface 314 is designed for contacting an abutting element 315 that is arranged on the frame 311 of the pivot accommodation 31. The abutting element 315 extends radially upwards from the pivot axis 310, in the static condition, when the rotor 3 is not rotating. In the static condition, there is a free space between the abutment 313 and the abutting element 315. When the rotor 3 rotates, the frame 311 pivots about the pivot axis 310 and the abutting element 315 performs a pivoting motion and thus the free space is reduced until the abutting element 315 touches the abutment 313. The bigger the free space in the static condition, the bigger is the possible angular deviation of the frame 311 with respect to the rotor. The smaller the height of the abutment 313, the bigger the free space in the static condition. With this combination of abutment 313 and abutting element 315, angular deviations from bigger than 0 degrees and smaller than 90 degrees can be realised.

Figure 12:
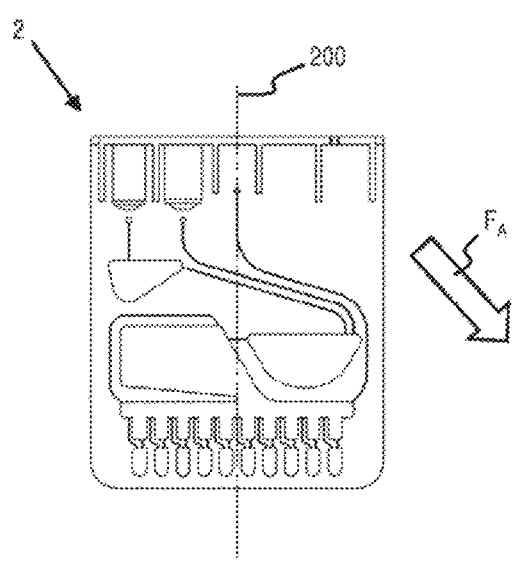
FIG. 12 a sample processing cartridge received in the pivot accommodation of FIG. 10.

FIG. 12 shows a sample processing cartridge received in the pivot accommodation of FIG. 7 with a resulting angular force vector FA of about 45 degrees. Different abutments 313 at different rotor arms enable different resulting force vectors acting on the cartridge 2 inserted in the respective frame. By placing a cartridge 2 subsequently in different positions of the rotor 3, i.e. in different frames of the centrifugal processing unit 1, different resulting force vectors can be applied correspondingly on said cartridge 2. This increases the possible paths that a liquid can take within a cartridge.

Figure 13:
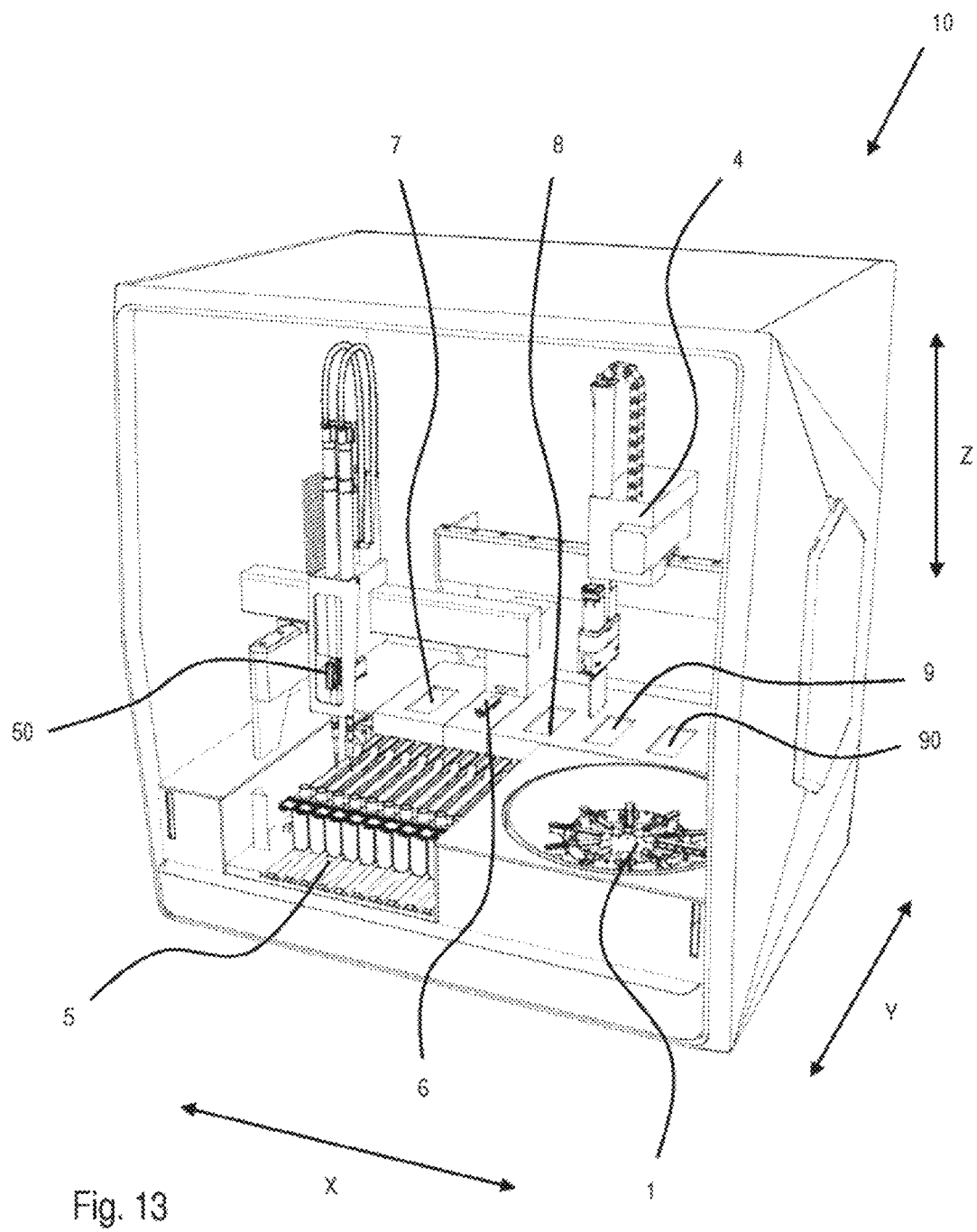
FIG. 13 a centrifugal processing system with a centrifugal processing unit of FIG. 1.

FIG. 13 shows a centrifugal processing system with a centrifugal processing unit 1. The centrifugal processing unit 1 is mounted on a base. A manipulator 4, a loading/unloading station 5, a sealing station 6, an irradiation station 7, a heating station 8, a detection/quantification station 9 and an identification station 90 are mounted on the same base. The base with the manipulator and all the stations are enclosed by a housing. The inside of the housing can be accessed by means of a hinged lid. This is favourable for maintenance. During normal operation, the loading/unloading station 5 is the only connection between the inside and the surrounding. The manipulator 4 is adapted to insert/remove a sample processing cartridge 2 in/from the centrifugal processing unit 1. The manipulator 4 can perform horizontal movements along horizontal axes X, Y and vertical movements along a vertical axis Z. Additionally, the manipulator 4 can rotate a cartridge about the vertical axis Z.

| REFERENCE SIGNS LIST | | | |
|---|---|---|---|
| 1 | Centrifugal processing unit | 342 | Handle |
| | | 4 | Manipulator |
| 10 | Centrifugal processing system | 5 | Loading station |
| | | 50 | Pipetting unit |
| 2 | Sample processing cartridge | 6 | Sealing station |
| 200 | Central axis | 7 | Irradiation station |
| 3 | Rotor | 8 | heating station |
| 300 | Rotor axis | 9 | detection/quantificaiton station |
| 31 | Accommodation | | |
| 310 | Pivot axis | 90 | identification station |
| 311 | Frame | | |
| 312 | Flange | F | Centrifugal force |
| 313 | Abutment | F1 | Force vector |
| 314 | Abutting surface | F2 | Force vector |
| 315 | Abutting element | F3 | Force vector |
| 34 | Blocking element | A | Angle |
| 340 | Disk | $F_A$ | Force vector |
| 341 | Recess | | |

The invention claimed is:

1. A centrifugal processing unit (1) for directing the movement of substances within a sample processing cartridge (2), the centrifugal processing unit (1) comprising:
at least one rotor (3) with at least one accommodation (31) for receiving the sample processing cartridge (2), the at least one accommodation (31) only allowing a free pivoting motion of the cartridge (2) about a respective pivot axis (310), wherein each pivot axis (310) is orthogonal to the rotor axis (300) and to a respective force vector (FI, F2, F3) of a centrifugal force (F), at least one rotor drive for rotating the at least one rotor (3) about a respective rotor axis (300) to create the centrifugal force (F), a control for accelerating and decelerating the at least one rotor (3), at least one blocking element (34), allowing the free pivoting motion of the cartridge (2)

in a release position and preventing the free pivoting motion in a blocking position, characterized in that the blocking element (34) comprises a disk (340) that is arranged on the at least one rotor (3), wherein the disk (340) is connected to the rotor shaft at a centre thereof and is spaced apart above the at least one accommodation (31), and in that the disk (340) comprises at least one recess (341) that extends from an outer edge of the disk (340) towards the centre and in that a handle is arranged on top of the disk (340) at a centre of gravity thereof.

2. The centrifugal processing unit (1) according to claim 1, wherein the blocking element (34) is arranged at the top of the shaft of the rotor (3).

3. The centrifugal processing unit (1) according to claim 1, wherein the blocking element (34) comprises at least one fixation element, which prevent a relative movement between the blocking element (34) and the rotor (3) during the rotation of the rotor (3).

4. The centrifugal processing unit (1) according to claim 1, wherein the at least one recess (341) comprises two or more recesses (341) that are evenly distributed on the circumference of the disk (340), so that the centre of gravity of the blocking element (34) corresponds to the centre of the disk (340).

5. The centrifugal processing unit (1) according to claim 1, wherein the at least one recess (341) comprises two or more recesses (341) that are asymmetrically distributed on the circumference of the disk (340) and at least one balancing weight, that is arranged on the disk (340) as such, that the centre of gravity of the blocking element (34) corresponds to the centre of the disk (340).

6. The centrifugal processing unit (1) according to claim 1, wherein each recess (341) of the at least one recess (341) is designed to allow only the fee free pivoting motion of a single cartridge (2).

7. The centrifugal processing unit (1) according to claim 1, wherein each recess (341) of the at least one recess (341) is designed to allow the fee free pivoting motion of two or more cartridges (2).

8. The centrifugal processing unit (1) according to claim 1, wherein the at least one accommodation (31) comprises an abutment (313), which prevents the sample processing cartridge (2) from pivoting over a predefined angle (A).

9. A centrifugal processing system (10) for directing the movement of substances within a sample processing cartridge (2), the centrifugal processing system (10) comprising:
a centrifugal processing unit (1) according to claim 1 and
at least one manipulator (4) adapted to be able to arrange the sample processing cartridge (2) in the at least one accommodation (31) or to remove it therefrom.

10. The centrifugal processing system (10) according to claim 9, wherein the manipulator (4) is adapted to be able to move the sample processing cartridge (2) in any horizontal or vertical direction (X, Y, Z).

11. The centrifugal processing system (10) according to claim 9, wherein the manipulator (4) is adapted to be able to perform an angular rotation of the sample processing cartridge (2) about an axis (Z) parallel to the rotor axis (300).

12. The centrifugal processing system (10) according to claim 11, wherein the angular rotation is a rotation about an angle greater than 0 degrees.

13. The centrifugal processing system (10) according to claim 9, wherein the manipulator (9) is adapted to be able to grip the handle (342) of the blocking element (34) and to realise a relative angular rotation between the blocking element (34) and the rotor (3) with respect to the rotor axis (300).

14. The centrifugal processing system (10) according to claim 9, wherein the centrifugal processing system (10) further comprises at least one additional station, wherein the at least one additional station can be selected from the group of loading/unloading station (5), sealing station (6), irradiation station (7), heating station (8), detection/quantification station (9) and identification station (90) or any other commonly known station for the treatment of the content of a sample processing cartridge (2) or the handling of a sample processing cartridge (2).

15. A process for directing the movement of substances within a sample processing cartridge (2), the process comprising the steps of:
providing a centrifugal processing unit (1) according to claim 1;
inserting a sample processing cartridge (2) in the at least one accommodation (31);
positioning the blocking element (34) in the release position, thereby allowing a free pivoting motion of the at least one accommodation (31) when the rotor (3) is rotated, and thereby creating a first force vector (FI) in a first direction with respect to the inserted sample processing cartridge (2);
rotating the at least one rotor (3) about the respective rotor axis (300);
stopping the rotation and thereby allowing the sample processing cartridge (2) to return to its initial position;
positioning the blocking element (34) in the blocking position, thereby preventing a free pivoting motion of the at least one accommodation (31) when the rotor (3) is rotated, and thereby creating a second force vector (F2) in a second direction with respect to the inserted sample processing cartridge (2).

16. The process according to claim 15, wherein the process further comprising the steps of:
removing the sample processing cartridge (2) from the at least one accommodation (31);
rotating the sample processing cartridge (2) about an axis (Z) parallel to the rotor axis (300);
inserting the sample processing cartridge (2) in the at least one accommodation (31);
thereby enabling the creation of a third force vector (F3) in a third direction with respect to the sample processing cartridge (2) when the at least one rotor (3) is rotated and the blocking element (34) is in the blocking position.

17. The process according to claim 15, wherein the process further comprising the steps of:
positioning of the sample processing cartridge (2) in an at least one additional station before or after inserting the sample processing cartridge (2) in the accommodation (31), wherein the at least one additional station can be selected from the group of loading/unloading station (5), sealing station (6), electromagnetic irradiation station, radioactive irradiation station, contact heating station, convection heating station, detection/quantification station, unloading station, identification station.

18. The process according to claim 15, wherein the free pivoting motion of the sample processing cartridge (2) is partially restricted by providing the accommodation (31) with an abutment (313) before the at least one rotor (3) is rotated.

19. The centrifugal processing system (10) according to claim 11, wherein the angular rotation is a rotation about an angle greater than 90 degrees.

20. The centrifugal processing system (10) according to claim 11, wherein the angular rotation is a rotation about an angle greater than 180 degrees.

* * * * *